Nov. 4, 1958    J. P. BAGBY ET AL    2,858,754
EXPOSURE CONTROL FOR PHOTOGRAPHIC CAMERAS
Original Filed Aug. 13, 1957    3 Sheets-Sheet 1
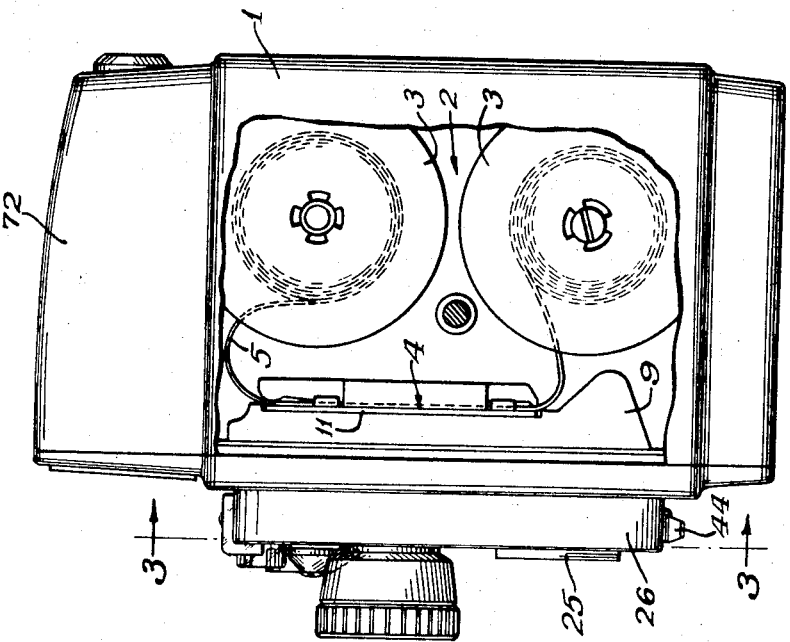
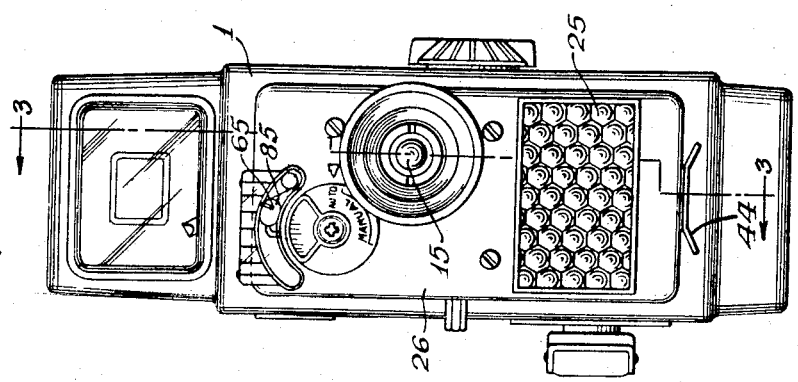
Inventors:
John P. Bagby
Stanley R. Freeland
Mervin W. LaRue, Jr.
By Robert F. Miehle    Atty.

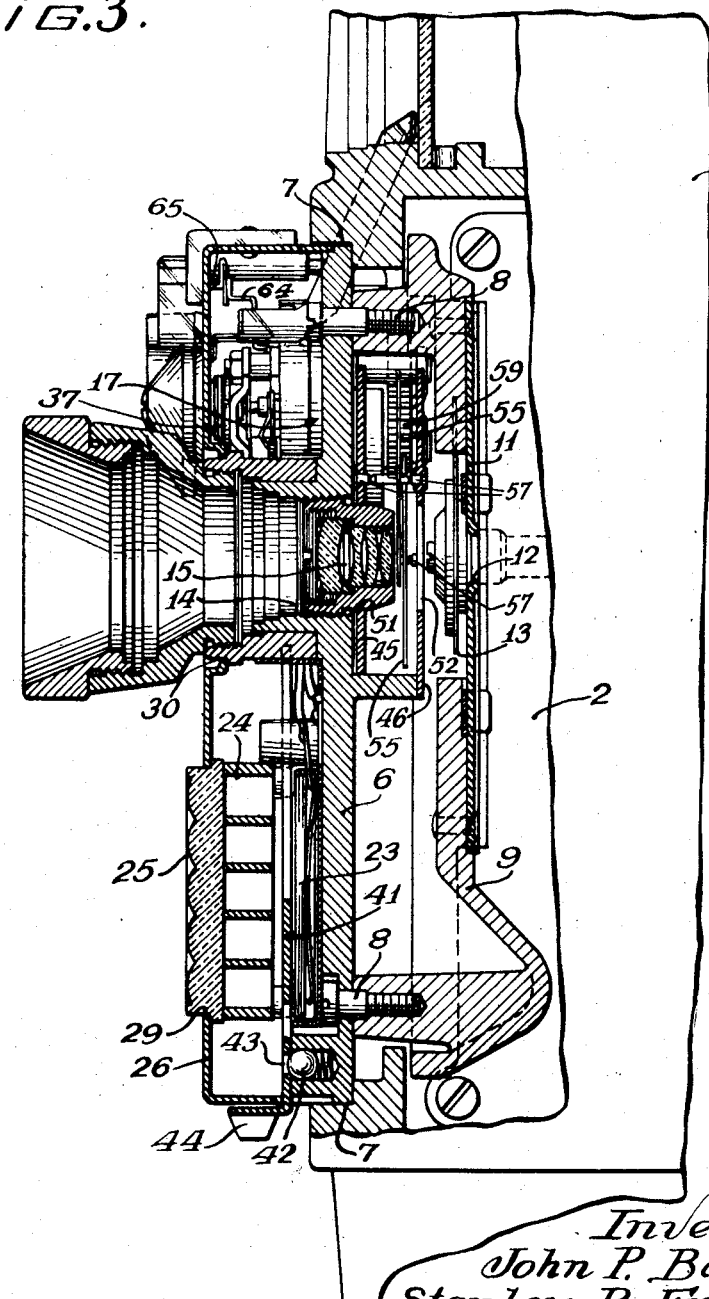

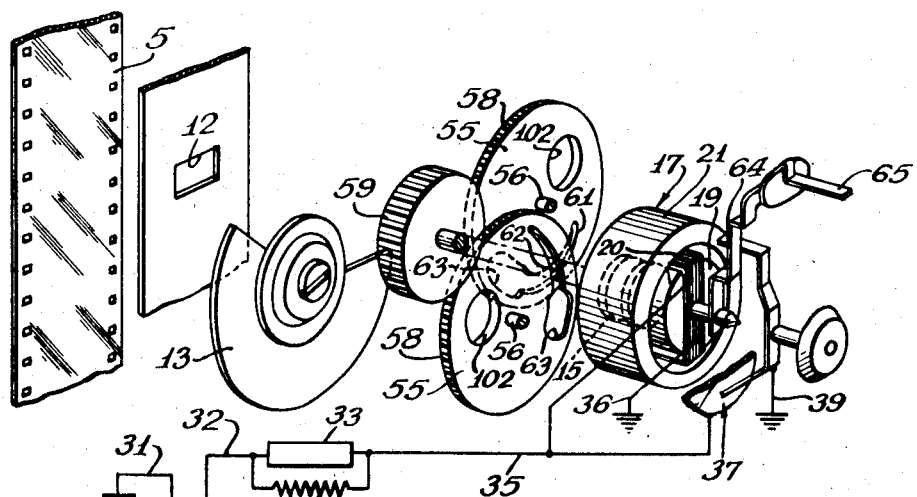
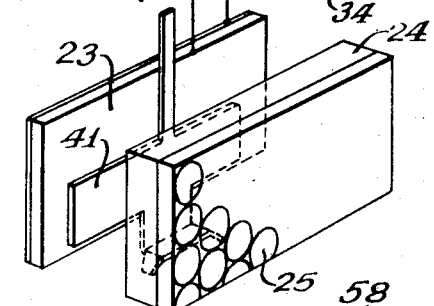
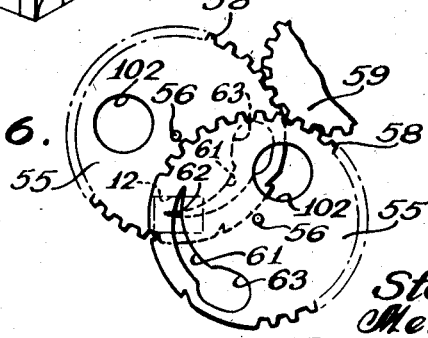
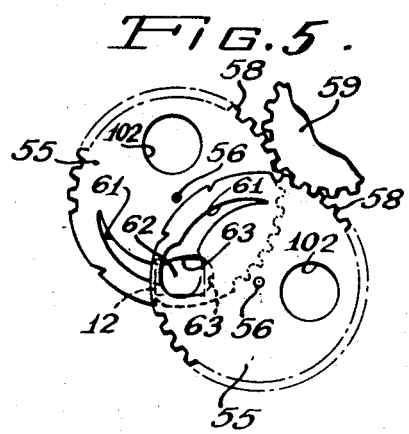

2,858,754

EXPOSURE CONTROL FOR PHOTOGRAPHIC CAMERAS

John P. Bagby, Skokie, Stanley R. Freeland, Evanston, and Mervin W. La Rue, Jr., Park Ridge, Ill., assignors to Bell & Howell Company, Chicago, Ill., a corporation of Illinois Original application August 13, 1957, Serial No. 677,865, now Patent No. 2,841,064, dated July 1, 1958. Divided and this application April 8, 1958, Serial No. 730,741

8 Claims. (Cl. 95—64)

This application is a division of our copending application, Serial No. 677,865, filed August 13, 1957 now Patent No. 2,841,064.

This invention relates to apparatus for adjusting the exposure of a photographic camera to provide proper exposure of the film therein under different light conditions, and has for its general object the provision of a new and improved apparatus of this character.

An object of the invention is to provide an apparatus for automatically adjusting the exposure aperture of a camera, which is compactly arranged and which together with the photographic lens of the camera is constructed as a unit which is detachably secured on the camera for convenience of manufacture and servicing.

A further object of this invention is to provide a novel aperture control mechanism which is light in construction, easy to assemble and economical to manufacture.

Another object of the invention is to provide a simple and effective adjustable exposure diaphragm which requires very little power to adjust the same and which is particularly adapted to be adjusted directly by a galvanometer which is energized by current derived from a photoelectric cell in proportion to light impinging on the cell, and which preferably is arranged between the exposure of the camera and the photographic lens thereof.

Another object of the invention is to provide an adjustable exposure diaphragm of the above type which, when used in conjunction with a rectangular exposure aperture of a camera, does not vignette the corners of the exposure aperture at small diaphragm openings.

Further objects of the invention not specifically mentioned will be apparent from the detailed description and claims which follow, reference being had to the accompanying drawings in which the preferred embodiment of the invention is shown by way of example only and in which:

Figure 1 is a front elevational view of a motion picture camera embodying the invention;

Figure 2 is a side elevational view of the camera shown in Figure 1 with a part of a side wall thereof broken away;

Figure 3 is a partial sectional view taken on the line 3—3 of Figure 1;

Figure 4 is an exploded view of the exposure control of the invention together with parts of the camera related thereto and including the circuit diagram of the control; and Figures 5 and 6 are partial rear elevational views of the diaphragm mechanism of the invention and showing it in different positions of its adjustment.

Referring to the drawings, particularly Figures 1 and 2, a motion picture camera, which per se is of standard design, comprises a casing 1 within which the mechanism of the camera is enclosed and which provides a film chamber 2 within which are arranged two vertically spaced rotatable film spools 3 and a vertical exposure guide 4 arranged at the front portion of the film chamber. A motion picture film 5 is fed from a roll thereof on the upper spool 3 to the exposure guide 4, and downwardly through the exposure guide, and taken up from the lower end of the exposure guide onto the lower film spool 3, the film being intermittently fed through the exposure guide.

The front wall 6 of the camera casing, see particularly Figure 3, comprises a separate part detachably secured in a shouldered opening 7 in the front of the main casing portion 1 by headed screws 8 screw threaded rearwardly into a frame part 9 fixed within the main casing portion.

The exposure guide 4 comprises a front guide plate 11 which is secured within the casing on the frame part 9 in rearwardly spaced relation with the front wall 6. The film 5 is guided against the rear face of the guide plate 11, and the guide plate is provided with a forwardly facing horizontally elongated rectangular exposure aperture 12, conforming with a standard motion picture frame, through which successive frames of the film are exposed as the film is intermittently fed through the exposure guide, a rotary shutter immediately in front of the guide plate being rotated in timed relation with the intermittent feed of the film to cover the exposure aperture during the film feed intervals as is usual.

The front wall 6 is provided with a lens opening 14 with which the exposure aperture 12 is alined, and a suitable photographic lens 15 is mounted on the front wall within the lens opening and in alinement with the lens opening and exposure aperture for forming images on the film at the exposure aperture.

A galvanometer 17 mounted within the casing 1 and of usual construction as shown in Figure 4, comprises a central circular permanent magnet 19, a pivoted rectangular spring biased circuit coil 20 surrounding the magnet, and a ring 21 of magnetic material surrounding the coil and serving to concentrate the magnetic field of the magnet, it being noted that the pivotal axis of the coil is normal to the plane of the exposure aperture 12.

A forwardly facing photoelectric cell 23 is mounted on the front face of the front wall 6 below the lens 15, see Figure 3, together with a usual light controlling baffle 24 in front of the cell and a usual reticular lens 25 in front of the baffle, the cell, baffle and reticular lens being secured in assembly on the front wall by a flanged cover 26 secured on the front wall in front of the same.

The cover 26 has an opening 29 surrounding the lens 25 and through which light passes rearwardly through this lens and the baffle 24 to the photoelectric cell, and has another opening 30 concentric with the lens 14 through which light passes rearwardly to the photographic lens 15, and the cover forms an enclosure in front of the front wall 6 and encloses the front portion of the galvanometer and other portions of the apparatus hereinafter described.

The circuit coil of the galvanometer is connected in circuit with the photoelectric cell 23, see Figure 4, so that the coil is deflected from its spring biased zero position by current derived from the photoelectric cell in proportion to the intensity of light impinging on the photoelectric cell, the photoelectric cell and galvanometer circuit comprising one terminal of the photoelectric cell connected, as designated at 31, to the metal frame work of the mechanism, which frame work is for convenience referred to as "ground," the other terminal of the cell connected by a conductor 32 to one terminal of a resistor 33 and of a resistor 34 which is connected in shunt with the resistor 34, the other terminals of these resistors connected by a conductor 35 to one terminal of the circuit coil 20 of the galvanometer, and the other terminal of this coil connected to ground as designated at 36.

The purpose of the resistors 33 and 34 is to compensate for the positive temperature coefficient of resistance of the photoelectric cell and galvanometer circuit per se, so that the deflection of the circuit coil 20 is approximately uniform throughout the range of temperature normally encountered in use, say from zero to 100° F., and for this purpose the resistor 33, commercially known as a thermistor, has a negative temperature coefficient of resistance greater than the positive temperature coefficient of resistance of the photoelectric cell and galvanometer circuit per se, and the resistor 34, serving as a modifying resistor, has a temperature coefficient of resistance lying between the positive temperature coefficient of resistance of the photoelectric cell and galvanometer circuit per se and the negative temperature coefficient of resistance of the thermistor 33, the characteristics of these resistances being selected to obtain the aforesaid compensation, as fully described and claimed in copending application for U. S. patent of Mervin W. LaRue, Jr. and William W. Wightman, Serial No. 628,-753, filed December 17, 1956, for Exposure Control For Photographic Cameras, and assigned to the assignee hereof.

The photoelectric cell and galvanometer circuit further comprises a switch, generally designated at 37 and hereinafter more fully described, one terminal of which is also connected to the conductor 35 and the other terminal of which is connected to ground, as designated at 39. This switch is normally open so that the circuit coil 20 of the galvanometer is energized by current derived from the photoelectric cell 23, but which when closed short circuits the photoelectric cell so that the circuit coil of the galvanometer is deenergized for a purpose hereinafter explained.

Referring to Figure 3, a shutter 41 is suitably mounted for vertical sliding movement within the cover 26 in front of the photoelectric cell 23 and between it and the light baffle 24. This shutter in its upper position, as shown in Figure 3, covers a portion of the photoelectric cell, and in its lower position uncovers this portion of the cell, for adjusting the deflection of the circuit coil 20 for variance of an exposure factor other than the intensity of the existing light, such as the emulsion speed of the film in the camera. The shutter 41 is releasably held in either of its positions by a spring urged ball detent 42 mounted on the front wall 6 and engageable in either of vertically spaced apertures 43 through the shutter, and the shutter is manually positionable by means of a grasp portion 44 below the cover 26.

A frame, see Figure 3, comprising front and rear plates 45 and 46 secured together in parallel relation is arranged immediately to the rear of the upper portion of the front wall 6, these frame plates being thus arranged parallel to the plane of the exposure aperture 12, and the front plate 45, see Figure 3, being provided with an aperture 51 rearwardly through which the photographic lens 15 projects, and the rear plate 46 being provided with an aperture 52 aligned with the exposure aperture and through which light passes from the lens 15 to the exposure aperture.

A pair of diaphragm disks 55 form an adjustable diaphragm for the photographic lens 15, and are arranged between and are mounted on the frame plates 45 and 46 for partial turn rotation, or oscillation, by means of spindles 56 extending through the disks in coaxial relation and secured therewith and having the ends thereof conical and rotatably engaged in opposing conical socket bearings 57 secured in alined apertures in the plates 45 and 46 to provide low friction bearings for the diaphragm disks.

As so mounted, the diaphragm disks 55 are arranged within the camera casing 1 and rearwardly of the front wall 6 between the exposure aperture 12 and the photographic lens 15, and are mounted for oscillation (or partial turn rotation) on spaced axes normal to the plane of the exposure aperture and spaced respectively outwardly and medially of adjoining sides of the exposure aperture, and have portions thereof overlapping in front of the exposure aperture, the diaphragm disks being slightly displaced axially from each other, as best shown in Figure 4, to provide for the overlapping relation thereof.

Noting that the pivotal axis of the circuit coil 20 of the galvanometer is parallel to those of the diaphragm disks 55 and referring particularly to Figure 4, the diaphragm disks are provided with peripheral spur gears 58, and a spur gear 59 is concentrically fixed with the circuit coil 20 and meshes with the gears 58, so that the circuit coil and diaphragm disks rotate in timed relation.

The diaphragm disks 55 are provided with arcuate openings 61 therethrough tapering in width and extending angularly of the disks and arranged to intersect centrally of the exposure aperture 12 with portions of substantially corresponding width, see Figures 4, 5 and 6, to form a diaphragm opening 62 variable with angular adjustment of the disks in said timed relation as will be observed in these figures, the wide ends of the arcuate openings being preferably abnormally wide with respect to the otherwise uniform taper of these openings, as designated at 63, to insure the photographic lens 15 operating at the maximum aperture thereof when the wide ends of the arcuate openings intersect as shown in Figure 5.

Noting that the pivotal movement of the circuit coil 20 of the galvanometer effects movement of the diaphragm disks in timed relation and consequent variance of the diaphragm opening 62, light impinging on the photoelectric cell 23 energizes the circuit coil in correspondence with the intensity of the light and correspondingly deflects the circuit coil from its zero position in which the diaphragm disks are positioned to provide the largest diaphragm opening, and this deflection correspondingly adjusts the diaphragm disks to provide a diaphragm opening corresponding with the intensity of the light impinging on the photoelectric cell.

Noting that the spaced rotational axes of the diaphragm disks 55 are spaced respectively outwardly and medially of adjoining sides of the rectangular exposure aperture 12, the arcuate openings 61 of the disks form at small diaphragm openings a substantially rectangular aperture oriented in correspondence with the exposure aperture, as shown in Figure 6 in which the exposure aperture 12 is indicated. This arrangement serves to prevent vignetting at the corners of the exposure aperture, and where as shown the rectangular exposure aperture is elongated, rather than widen one of the arcuate openings, the diaphragm disks are relatively slightly differently timed as shown to form at small diaphragm openings an elongated substantially rectangular aperture oriented in correspondence with the elongated rectangular exposure aperture also for the purpose of preventing vignetting at the corners of the elongated rectangular exposure aperture.

Preferably as shown, the diaphragm disks are identical in all respects, the gears 58 being of equal radii and the arcuate openings 61 being identical, in which case the rotational axes of the diaphragm members are equidistant from the center of the exposure aperture 12.

An arm 64 is secured with the circuit coil 20 of the galvanometer for pivotal movement with the circuit coil and is disposed forwardly of the circuit coil and extends radially of and upwardly from the pivotal axis of the coil within the closure of the cover 26, see Figure 4, and is provided at its upper end with a forwardly projecting pointer 65 which projects forwardly through an arcuate opening 66 through the upper portion of the front of the cover 26 to be visible from the exterior of the cover so that the position of the circuit coil 20 and consequently the adjustment of the diaphragm disks 55 may be observed.

The circuit coil 20 and the parts fixed for rotation therewith and the diaphragm disks 55 are preferably rotationally balanced, and the diaphragm disks, see Figures 5 and 6, being provided with counterbalancing apertures 102 arranged in diametrically opposite counterbalancing relation with the arcuate diaphragm opening forming openings 61 of the diaphragm disks.

Noting that the meshing gears 58 and 59 of the diaphragm disks and galvanometer circuit coil 20 provide rotation of the circuit coil and gear 59 fixed therewith opposite that of the diaphragm disks, these oppositely rotating elements are provided with relative rotational inertia such as to oppose rotation thereof relative to and responsive to rotational movement of the camera, so that such movement of the camera does not affect the diaphragm opening adjustment.

It has been observed in operation that, while the automatic exposure control is sensitive and quickly responsive to exposure light change, the galvanometer circuit coil 20 and diaphragm disks 55 are not subject to appreciable oscillation when the potential on the circuit coil changes suddenly, and it is thought that this is due to the damping effect of the slight friction of the mesh of the gears 58 and 59 and the bearings of the circuit coil 20 and the diaphragm disks 55.

Since changes can be made in the foregoing construction and different embodiments of the invention can be made without departing from the spirit and scope thereof, it is intended that all matter shown in the accompanying drawings and described hereinabove shall be interpreted as illustrative and not in a limiting sense.

What is claimed as new is:

1. In a photographic camera, an exposure aperture, a pair of diaphragm members mounted for anti-friction oscillation on spaced axes normal to the plane of said aperture and spaced laterally of said aperture, said diaphragm members lying in spaced planes generally parallel to each other and the plane of the aperture and having portions thereof overlapping each other and said aperture, a positive gear drive connection between said diaphragm members connecting them in an initially timed relation relative to each other and to oscillate at the same angular velocity, said diaphragm members being provided with arcuate openings therethrough tapering in width and extending angularly of said diaphragm members and arranged to intersect centrally of said exposure aperture with portions of substantially corresponding width to form a diaphragm opening variable with angular displacement of said diaphragm members in said timed relation so that the diaphragm opening is maintained in a constantly substantially centered relation relative to said exposure aperture, said gear drive connection comprising respective gear sections of the same gear radius rigid with said diaphragm members and at least one intermediate gear drivingly interconnected with said respective gears.

2. In a photographic camera, an exposure aperture, a pair of diaphragm members mounted for anti-friction oscillation on spaced axes normal to the plane of said aperture and spaced laterally of said aperture, said diaphragm members lying in spaced planes generally parallel to each other and the plane of the aperture and having portions thereof overlapping each other and said aperture, a positive gear drive connection between said diaphragm members connecting them in an initially timed relation relative to each other and to oscillate at the same angular velocity, said diaphragm members being provided with arcuate openings therethrough tapering in width and extending angularly of said diaphragm members and arranged to intersect centrally of said exposure aperture with portions of substantially corresponding width to form a diaphragm opening variable with angular displacement of said diaphragm members in said timed relation so that the diaphragm opening is maintained in a constantly substantially centered relation relative to said exposure aperture, said gear drive connection comprising respective gear sections of the same gear radius rigid with said diaphragm members, said axes being positioned relative to said exposure aperture to provide approximately a right angle between radius lines drawn from the respective axes through the center of the exposure aperture.

3. In a photographic camera, an exposure aperture, a pair of diaphragm members mounted for anti-friction oscillation on spaced axes normal to the plane of said aperture and spaced laterally of said aperture, said diaphragm members lying in spaced planes generally parallel to each other and the plane of the aperture and having portions thereof overlapping each other and said aperture, a positive gear drive connection between said diaphragm members connecting them to oscillate in timed relation relative to each other, said diaphragm members being provided with arcuate openings therethrough tapering in width and extending angularly of said diaphragm members and arranged to intersect centrally of said exposure aperture with portions of substantially corresponding width to form a diaphragm opening variable with angular displacement of said diaphragm members in said timed relation, said gear drive connection comprising respective gears rigid with said diaphragm members and at least one intermediate gear drivingly interconnected with said respective gears, and actuating mechanism driving said intermediate gear, said intermediate gear and said aperture being positioned on opposite sides of the center line extending between said axes so that said actuating mechanism does not interfere with the light rays conducted through said aperture and diaphragm opening.

4. In a photographic camera, an exposure aperture, a pair of diaphragm members mounted for anti-friction oscillation on spaced axes normal to the plane of said aperture and spaced laterally of said aperture, said diaphragm members lying in spaced planes generally parallel to each other and the plane of the aperture and having portions thereof overlapping each other and said aperture, a positive gear drive connection between said diaphragm members connecting them to oscillate in timed relation relative to each other, said diaphragm members being provided with arcuate openings therethrough tapering in width and extending angularly of said diaphragm members and arranged to intersect centrally of said exposure aperture with portions of substantially corresponding width to form a diaphragm opening variable with angular displacement of said diaphragm members in said timed relation, said gear and drive connection comprising gear teeth formed in the peripheral edge of each of said diaphragm members and a single gear member positioned externally of the peripheries of said diaphragm members in toothed connection with both said diaphragm members to drive them in the same direction of rotation.

5. In a photographic camera, an exposure aperture, a pair of diaphragm members mounted for anti-friction oscillation on spaced axes normal to the plane of said aperture and spaced laterally of said aperture, said diaphragm members lying in spaced planes generally parallel to each other and the plane of the aperture and having portions thereof overlapping each other and said aperture, a positive gear drive connection between said diaphragm members connecting them to oscillate in timed relation relative to each other, said diaphragm members being provided with arcuate openings therethrough tapering in width and extending angularly of said diaphragm members and arranged to intersect centrally of said exposure aperture with portions of substantially corresponding width to form a diaphragm opening variable with angular displacement of said diaphragm members in said timed relation, said gear drive connection including gear teeth formed in the outer peripheries of said diaphragm members and at least one gear drivingly interconnected with said peripheral gear teeth, and actuating mechanism driving said intermediate gear, said intermediate gear and said aperture being positioned on opposite sides of the center line extending between said axes so that said actuating mechanism does not interfere with the light rays conducted through said aperture and diaphragm opening.

6. In a photographic camera, an exposure aperture, a pair of diaphragm members mounted for anti-friction oscillation on spaced axes normal to the plane of said aperture and spaced laterally of said aperture, said diaphragm members lying in spaced planes generally parallel to each other and the plane of the aperture and having portions thereof overlapping each other and said aperture, a positive gear drive connection between said diaphragm members connecting them in an initially timed relation relative to each other and to oscillate at the same angular velocity, said diaphragm members being provided with arcuate openings therethrough tapering in width and extending angularly of said diaphragm members and arranged to intersect centrally of said exposure aperture with portions of substantially corresponding width to form a diaphragm opening variable with angular displacement of said diaphragm members in said timed relation so that the diaphragm opening is maintained in a constantly substantially centered relation relative to said exposure aperture, said gear drive connection comprising respective gear sections of the same gear radius rigid with said diaphragm members and a single intermediate gear member in toothed engagement with both said last named gears for rotation of both of said diaphragms in the same direction of rotation.

7. In a photographic camera, a rectangular exposure aperture, a pair of diaphragm members mounted for anti-friction oscillation on spaced axes normal to the plane of said aperture spaced laterally of said aperture and intersecting said plane on respective lines generally medial of the respective adjacent sides of said rectangular exposure aperture, said diaphragm members lying in spaced planes generally parallel to each other and the plane of the aperture and having portions thereof overlapping each other and said aperture, a positive gear drive connection between said diaphragm members connecting them in initially timed relation relative to each other and to oscillate at the same angular velocity, said diaphragm members being provided with arcuate openings therethrough tapering in width and extending angularly of said diaphragm members and arranged to intersect centrally of said exposure aperture with portions of substantially corresponding width to form a diaphragm opening variable with angular adjustment of said diaphragm members in said timed relation so that the diaphragm opening is maintained in a constantly substantially centered relation relative to said exposure aperture, said gear connection comprising respective gear sections of the same gear radius rigid with said diaphragm members, said axes being positioned relative to said exposure aperture to provide approximately a right angle between radius lines drawn from the respective axes through the center of the exposure aperture thereby providing a diaphragm opening that is substantially rectangular and in orientation with the rectangular exposure aperture.

8. In a photographic camera, an elongated rectangular exposure aperture, a pair of diaphragm members mounted for anti-friction oscillation on spaced axes normal to the plane of said aperture spaced laterally of said aperture and intersecting said plane on respective lines generally medial of the respective adjacent sides of said rectangular exposure aperture, said diaphragm members lying in spaced planes generally parallel to each other and the plane of the aperture and having portions thereof overlapping each other and said aperture, a positive gear drive connection between said diaphragm members connecting them in initially timed relation relative to each other and to oscillate at the same angular velocity, said diaphragm members being provided with arcuate openings therethrough tapering in width and extending angularly of said diaphragm members and arranged to intersect centrally of said exposure aperture with portions of substantially corresponding width to form a diaphragm opening variable with angular adjustment of said diaphragm members in said timed relation so that the diaphragm opening is maintained in a constantly substantially centered relation relative to said exposure aperture, said gear connection comprising respective gear sections of the same gear radius rigid with said diaphragm members, said axes being positioned relative to said exposure aperture to provide approximately a right angle between radius lines drawn from the respective axes through the center of the exposure aperture, said initial timing placing one of said diaphragm openings in angular advance relative to the other thereby providing a diaphragm opening that is substantially elongated rectangular and in orientation with the rectangular exposure aperture.

References Cited in the file of this patent

UNITED STATES PATENTS

| 1,247,682 | Howell | Nov. 27, 1917 |
| 2,209,639 | Tonnies | July 30, 1940 |
| 2,412,424 | Rath | Dec. 10, 1946 |
| 2,551,085 | Bach | May 1, 1951 |

FOREIGN PATENTS

| 145,699 | Australia | May 11, 1936 |
| 503,901 | Great Britain | Apr. 17, 1939 |
| 985,935 | France | Mar. 21, 1951 |